April 30, 1929.  G. F. WIKLE  1,711,073
TIRE BUILDING MACHINE
Filed April 11, 1927
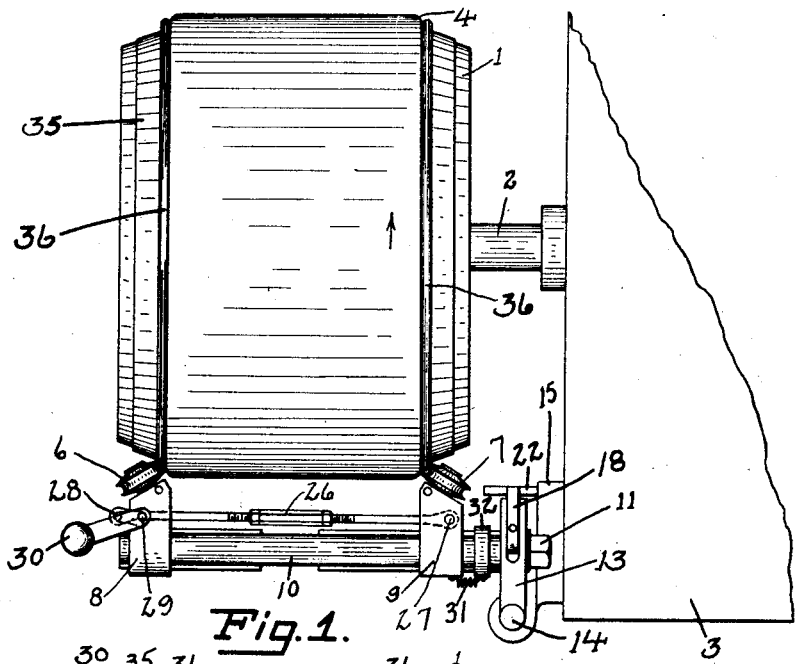
Fig. 1.
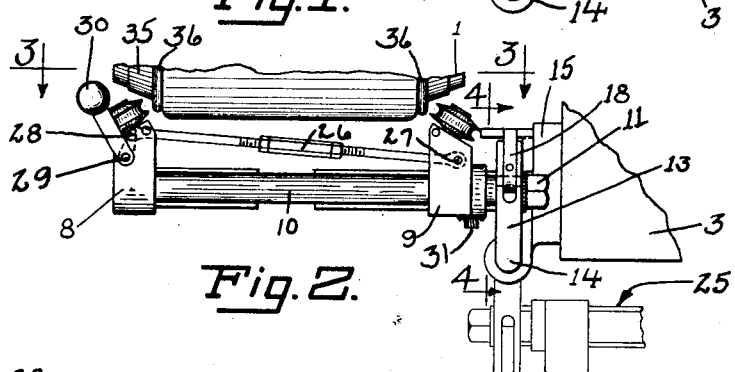
Fig. 2.
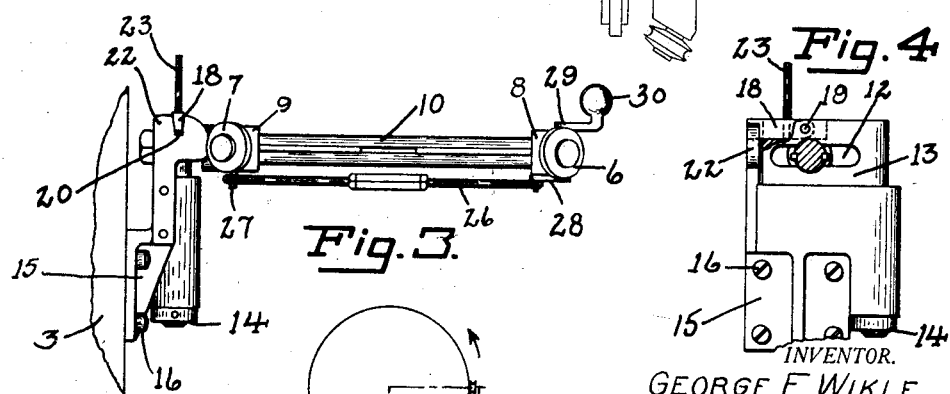
Fig. 3.
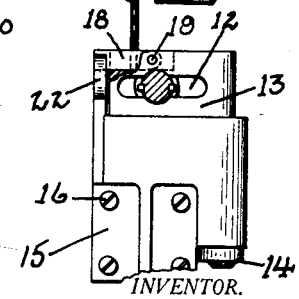
Fig. 4.
Fig. 5
INVENTOR.
GEORGE F. WIKLE
BY
ATTORNEY.

Patented Apr. 30, 1929.

1,711,073

UNITED STATES PATENT OFFICE.

GEORGE F. WIKLE, OF MILWAUKEE, WISCONSIN, ASSIGNOR TO FISK RUBBER COMPANY, OF CHICOPEE FALLS, MASSACHUSETTS, A CORPORATION OF MASSACHUSETTS.

TIRE-BUILDING MACHINE.

Application filed April 11, 1927. Serial No. 182,930.

My invention relates to machines for building pneumatic tire casings on substantially flat pulleys or formers and more particularly to a device for setting the annular bead cores in position.

It is among the objects of my invention to provide means for accurately and automatically setting both beads in position simultaneously. Other and further objects will be apparent from the following specification and claims.

In the accompanying drawings which illustrate one embodiment of my invention

Figure 1 is a plan view showing the parts in bead setting position,

Figure 2 is a similar view showing the bead setting rolls in position, to be brought into contact with the beads, Figure 3 is a front view substantially on line 3—3 of Figure 2, Figure 4 is a detail view of the locking device, substantially on line 4—4 of Figure 2, and Figure 5 is a diagram showing the relative position of the bead cutting rolls with respect to the core.

Referring to the drawings 1 designates the collapsible pulley or former, upon which the tire is built, secured to a shaft 2, and adapted, to be rotated in the direction of the arrow in Figure 1 by a motor or other source of power enclosed in housing 3 of the tire building machines. The pulley or tire support 1 is formed with bead receiving shoulders 4.

The bead setting rolls 6 and 7 are rotatably mounted in angular relation on blocks 8 and 9 splined on a shaft 10 adjustably secured as by a nut 11 in a slot 12 formed in a plate 13 pivoted at 14 to a bracket 15 secured to housing 3 by machine screws 16. Shaft 10 is adapted to be locked in operative position as shown by means of a latch 18 pivoted at 19 to plate 13 and adapted to seat in a recess 20 formed in a member 22 secured to bracket 15. Latch 18 is provided with a handle 23 by which the latch may be released and the shaft 10 and associated parts swung to inoperative position as shown in outline at 25 in Figure 2.

Blocks 8 and 9 are connected for simultaneous movement towards each other, and into bead setting position, by an adjustable link 26 pivoted at one end to block 9 at 27 and at the other to one arm 28 of a bell crank pivoted at 29 to block 8. The free arm of crank 28 is provided with an operating handle 30. As is shown in Figure 1, arm 28 slightly passes dead center to lock rolls 6 and 7 in bead setting position. Adjustable link 26 accurately predetermines the spacing of rolls 6 and 7 when the latter are in bead setting position. Since blocks 8 and 9 are both slidable on shaft 10 they automatically position themselves when drawn into contact with the beads, whether or not they were accurately centered with respect to the core when in open position or not, provided both rolls when in open position are outside of the bead cores. This latter condition is assured by means of collar 32 fixed to shaft 10 and connected by spring 31 to block 9. Shaft 10 is so positioned with respect to the tire support and its direction of rotation that the bead setting rolls operate substantially in the lower quadrant of the upwardly moving side of the tire support as indicated at "A" in Figure 5. This relation of parts is an essential element of my invention. For reasons later explained and also for convenience of operation I prefer to position the rolls at the upper limit of the defined quadrant, that is in a horizontal plane passing through the axis of the tire support, whatever position within said quadrant the rolls are positioned their axis of rotation lie in a plane passing through the axis of the tire support.

In operation, one or more plies of carcass material 35 having been placed on the support 1 and rolled or otherwise conformed to the shape of the support, bead cores 36 are slipped over the tapered edges of the support to approximate position and the bead setting rolls are locked in operating position as shown in Figure 1. The bead cores and carcass material, being coated with raw rubber or rubber cement, are tacky and when the bead cores are progressively forced home against the shoulders 4 they normally tend to drag the carcass material with them, loosening the latter at shoulders 4 and causing wrinkles.

This tendency has proved an obstacle to the use of automatic bead setters and various attempts have been made to overcome it, as by clamping the edges of the carcass material to the support. Such expedients require additional equipment, bothersome to handle and their use consumes a substantial amount of time. I have solved this difficulty by positioning the bead setting rolls in the lower quadrant of the upwardly moving side of the support. Due to the taper of the edges of the carcass material and the fact that the bead cores are initially spaced from the shoulders 4, the bead cores under the action of gravity hug the top of the support and hang relatively loosely at the bottom. By placing the bead setting rolls in the lower quadrant of the upwardly moving side of the support the free portions of the bead cores are behind the bead setting rolls, gravity tending to hold the beads away from the carcass and permitting the rolls to force the beads progressively home, as the support is rotated, without wrinkling or displacing the carcass material. This action is greatest at the upper limit of the specified quadrant and for that reason I prefer to position the bead setting rolls in the horizontal plane passing through the axis of the support.

At the completion of the operation handle 30 is rotated to release rolls 6 and 7 from the beads, latch 18 is raised and shaft 10, with its associated parts, is swung to outline position 25 of Figure 2 to permit free access to the tire for further operations.

I claim:

1. A device for applying bead cores to a tire carcass while the latter is positioned on a substantially cylindrical rotatable tire support, comprising, a pair of spaced bead setting rolls adapted to be positioned adjacent the support and link mechanism to move said rolls towards each other to press a portion of the cores into predetermined relation with the tire carcass and to progressively apply the bead cores to the carcass as the support is rotated.

2. A device for applying bead cores to a tire carcass while the latter is positioned on a rotatable tire support, comprising, a pair of spaced bead setting rolls adapted to be positioned adjacent the support, means to move said rolls toward each other to press a portion of the cores into predetermined relation with the tire carcass and to progressively apply the bead cores to the carcass as the support is rotated, and means to initially position said rolls so that they will automatically center themselves with respect to the core as they are moved into bead engaging position.

3. A device for applying bead cores to a tire carcass while the latter is positioned on a rotatable tire support, comprising, a pair of spaced bead setting rolls adapted to be positioned adjacent the support, means to move said rolls toward each other and to lock them in predetermined spaced relation, and means to initially position said rolls so that they will automatically center themselves with respect to the core as they are moved into bead engaging position.

4. A device for applying bead cores to a tire carcass while the latter is positioned on a rotatable support, comprising, a pair of angularly positioned spaced bead setting rolls adapted to be positioned adjacent the support, means to move said rolls toward each other and to lock them in predetermined spaced relation, and means to initially position said rolls so that they will automatically center themselves with respect to the core as they are moved into bead engaging position.

5. A device for applying bead cores to a tire carcass while the latter is positioned on a rotatable support, comprising, a shaft adapted to be positioned adjacent the support, a pair of bead setting rolls slidably mounted on the shaft, adjustable means to slide said rolls toward each other and to lock them in predetermined spaced relation, a collar fixed to the shaft, and a spring connecting said collar and one of said rolls to initially position said rolls so that they will automatically center themselves with respect to the support as they are moved into bead engaging position.

6. A device of the character described comprising, a rotatable tire support, a pair of spaced bead setting rolls, means to position said rolls adjacent the support and in the lower quadrant of the upwardly moving side of the latter, and means to move said rolls toward each other to press a portion of the cores into predetermined relation with the tire carcass and to progressively apply the bead cores to the carcass as the support is rotated.

7. A device of the character described, comprising a rotatable tire support, a pair of spaced bead setting rolls, means to position said rolls adjacent the support and in the lower quadrant of the upwardly moving side of the latter, means to move said rolls toward each other to press a portion of the cores into predetermined relation with the tire carcass and to progressively apply the bead cores to the carcass as the support is rotated, and means to initially position said rolls so that they will automatically center themselves with respect to the core as they are moved into bead engaging position.

8. A device of the character described, comprising, a rotatable tire support, a pair of spaced bead setting rolls, means to position said rolls adjacent the support and in the lower quadrant of the upwardly moving side of the latter, means to move said rolls toward each other and to lock them in predetermined spaced relation, and means to initially position said rolls so that they will automatically center themselves with respect to the core as they are moved into bead engaging position.

9. A device of the character described, comprising, a rotatable tire support, a pair of angularly positioned spaced bead setting rolls means to position said rolls adjacent the support and in the lower quadrant of the upwardly moving side of the latter, means to move said rolls toward each other and to lock them in predetermined spaced relation, and means to initially position said rolls so that they will automatically center themselves with respect to the core as they are moved into bead engaging position.

10. A device of the character described, comprising, a rotatable tire support, a shaft adapted to be positioned adjacent the support and in the lower quadrant of the upwardly moving side of the latter, a pair of bead setting rolls slidably mounted on the shaft, and adjustable means to slide said rolls toward each other and to lock them in predetermined spaced relation.

11. A device of the character described, comprising, a rotatable tire support, a shaft adapted to be positioned adjacent the support and in the lower quadrant of the upwardly moving side of the latter, a pair of bead setting rolls slidably mounted on the shaft, adjustable means to slide said rolls toward each other and to lock them in predetermined spaced relation, a collar fixed to the shaft, and a spring connecting said collar and one of said rolls to initially position said rolls so that they will automatically center themselves with respect to the support as they are moved into bead engaging position.

12. A device of the character described comprising, a rotatable tire support, a pair of spaced bead setting rolls, means to position said rolls adjacent the upwardly moving side of the support and in the horizontal plane passing through the axis of the latter, and means to move said rolls toward each other to press a portion of the cores into predetermined relation with the tire carcass and to progressively apply the bead cores to the carcass as the support is rotated.

13. A device of the character described, comprising a rotatable tire support, a pair of spaced bead setting rolls, means to position said rolls adjacent the upwardly moving side of the support and in the horizontal plane passing through the axis of the latter, means to move said rolls toward each other to press a portion of the cores into predetermined relation with the tire carcass and to progressively apply the bead cores to the carcass as the support is rotated, and means to initially position said rolls so that they will automatically center themselves with respect to the core as they are moved into bead engaging position.

14. A device of the character described, comprising a rotatable tire support, a pair of spaced bead setting rolls, means to position said rolls adjacent the upwardly moving side of the support and in the horizontal plane passing through the axis of the latter, means to move said rolls toward each other and to lock them in predetermined spaced relation, and means to initially position said rolls so that they will automatically center themselves with respect to the core as they are moved into bead engaging position.

15. A device of the character described, comprising, a rotatable tire support, a pair of angularly positioned spaced bead setting rolls means to position said rolls adjacent the upwardly moving side of the support and in the horizontal plane passing through the axis of the latter, means to move said rolls toward each other and to lock them in predetermined spaced relation, and means to initially position said rolls so that they will automatically center themselves with respect to the core as they are moved into bead engaging position.

16. A device of the character described, comprising, a rotatable tire support, a shaft adapted to be positioned adjacent the upwardly moving side of the support and in the horizontal plane passing through the axis of the latter, a pair of bead setting rolls slidably mounted on the shaft, and adjustable means to slide said rolls toward each other and to lock them in predetermined spaced relation.

17. A device of the character described, comprising, a rotatable tire support, a shaft adapted to be positioned adjacent the upwardly moving side of the support and in the horizontal plane passing through the axis of the latter, a pair of bead setting rolls slidably mounted on the shaft, adjustable means to slide said rolls toward each other and to lock them in predetermined spaced relation, a collar fixed to the shaft, and a spring connecting said collar and one of said rolls to initially position said rolls so that they will automatically center themselves with respect to the support as they are moved into bead engaging position.

18. A device of the character disclosed comprising a rotatable tire support, a pair of spaced bead setting rolls and means to position said rolls adjacent the support and in the lower quadrant of the upwardly moving side of the latter.

In testimony whereof I have signed my name to the above specification.

GEORGE F. WIKLE.